United States Patent
Wheelock

(12) 
(10) Patent No.: US 12,470,975 B2
(45) Date of Patent: Nov. 11, 2025

(54) APPARATUSES, METHODS, AND SYSTEM FOR REPLACING PHYSICAL NETWORK CONNECTION WITH Wi-Fi IN 2-BOX NETWORKING SETUPS

(71) Applicant: ARRIS Enterprises LLC, Suwanee, GA (US)

(72) Inventor: Ian G. Wheelock, Cork (IE)

(73) Assignee: ARRIS ENTERPRISES LLC, Horsham, PA (US)

( * ) Notice: Subject to any disclaimer, the term of this patent is extended or adjusted under 35 U.S.C. 154(b) by 640 days.

(21) Appl. No.: 17/496,946

(22) Filed: Oct. 8, 2021

(65) Prior Publication Data

US 2022/0116817 A1 Apr. 14, 2022

Related U.S. Application Data

(60) Provisional application No. 63/165,986, filed on Mar. 25, 2021, provisional application No. 63/089,530, filed on Oct. 8, 2020.

(51) Int. Cl.
*H04W 28/02* (2009.01)
*H04W 28/12* (2009.01)
(Continued)

(52) U.S. Cl.
CPC ....... *H04W 28/0273* (2013.01); *H04W 28/12* (2013.01); *H04W 80/02* (2013.01); *H04W 84/12* (2013.01)

(58) Field of Classification Search
CPC . H04W 28/0273; H04W 28/12; H04W 80/02; H04W 84/12; H04L 45/306
See application file for complete search history.

(56) References Cited

U.S. PATENT DOCUMENTS

2004/0013259 A1* 1/2004 Zhang ............... H04M 3/42314
379/229
2007/0014288 A1* 1/2007 Lim ....................... H04L 69/08
370/469

(Continued)

OTHER PUBLICATIONS

International Preliminary Report on Patentability and Written Opinion mailed Apr. 20, 2023 in International Application No. PCT/US2021/054113.

(Continued)

*Primary Examiner* — Thinh D Tran
(74) *Attorney, Agent, or Firm* — Wenderoth, Lind & Ponack, L.L.P.

(57) ABSTRACT

Optimizing traffic routing operations in a two-box WLAN setup including a gateway device and a WAN adaptor device. The WAN adaptor device receives initial packets of a traffic flow from a client device, and sends the initial packets to the gateway device for slowpath (SP) processing. The gateway device creates fastpath (FP) processing rules for the traffic flow, including traffic modifications resulting from the SP processing, and sends the FP processing rules to the WAN adaptor device. The WAN adaptor device applies the FP processing rules to perform the traffic modifications on subsequent packets of the second traffic flow. The FP processing rules enable the WAN adaptor device to forward the subsequent packets of the traffic flow to the client device directly, without bridging to the gateway device for FP processing.

16 Claims, 9 Drawing Sheets

(51) Int. Cl.
*H04W 80/02* (2009.01)
*H04W 84/12* (2009.01)

(56) References Cited

U.S. PATENT DOCUMENTS

| | | | |
|---|---|---|---|
| 2011/0103310 A1* | 5/2011 | Stojanovski | H04W 76/12 |
| | | | 370/328 |
| 2014/0105039 A1* | 4/2014 | Mcdysan | H04L 45/02 |
| | | | 370/252 |
| 2014/0156954 A1 | 6/2014 | Janakiraman et al. | |
| 2016/0261457 A1* | 9/2016 | Gupta | H04W 24/04 |
| 2016/0315921 A1* | 10/2016 | Dara | H04L 69/166 |
| 2017/0214721 A1* | 7/2017 | Pearce | H04L 65/4025 |
| 2017/0251405 A1* | 8/2017 | Stojanovski | H04W 8/082 |
| 2018/0198879 A1 | 7/2018 | Jalan et al. | |
| 2019/0124580 A1* | 4/2019 | Lu | H04W 76/12 |

OTHER PUBLICATIONS

International Search Report and the Written Opinion of the International Searching Authority dated Feb. 1, 2022 in International (PCT) Application No. PCT/US2021/054113.

* cited by examiner

APPARATUSES, METHODS, AND SYSTEM FOR REPLACING PHYSICAL NETWORK CONNECTION WITH Wi-Fi IN 2-BOX NETWORKING SETUPS

BACKGROUND

A number of Service Providers operate a so-called "two-box" solution for connecting users to the Internet (e.g., via a wide area network (WAN)). The $1^{st}$ box is typically a Layer 2 (L2) based device (also referred to herein as a "WAN adaptor," examples of which may include an embedded multimedia terminal adaptor (eMTA), an optical network unit (ONU), etc.) that isolates the Internet/WAN technology in use to effectively an Ethernet interface. The $2^{nd}$ box is typically the "home gateway" (HGW) connecting to the $1^{st}$ box using Ethernet. As a home gateway, the $2^{nd}$ box operates as an IP router and creates a home network using Ethernet, Wi-Fi and other networking technologies, and can operate one or more home IP subnets for connected home devices. The Ethernet link from the $1^{st}$ box connects as an interface into the $2^{nd}$ box router, and typically receives a dynamically allocated IP address, which may be referred to as the WAN IP address. Due to IP address exhaustion, the $2^{nd}$ box includes network address translation (NAT) functionality that NATs all home network traffic to the dynamic WAN IP address before forwarding out to the $1^{st}$ box that delivers traffic to the service provider Internet connection.

In most cases, the $1^{st}$ and $2^{nd}$ box are collocated at the Internet service point of entry in the home, using a short Ethernet link between them (e.g., a 4-6 foot long Ethernet cable), as shown in FIG. 3(a). Sometimes a user may have a structured wiring setup (e.g., coax cables, fiber optic, etc.) in their home that allows the $2^{nd}$ box to be located remotely from the $1^{st}$ box; this can also be achieved by just using a much longer Ethernet connection between the two boxes, as shown in FIG. 3(b).

If the $2^{nd}$ box includes Wi-Fi, then there are benefits of relocating the $2^{nd}$ box (to say, the center of the user's home), where the omnidirectional Wi-Fi RF signals can reach more of the user's devices compared to having the $2^{nd}$ box located at the point of entry (often times close to an exterior wall). However not all homes have structured wiring (coax/fiber), or it may not be possible or desirable to allow long Ethernet cables to stretch from the $1^{st}$ box to the $2^{nd}$ box.

If the $2^{nd}$ box remains co-located with the $1^{st}$ box (e.g., at the Internet service point of entry), and Wi-Fi performance of the $2^{nd}$ box from this location cannot reach all of the user's Wi-Fi devices (that is, some wireless client devices may be out of wireless communication range of the HGW), a typical remedy is to deploy a Wi-Fi Extender that connects via Ethernet or Wi-Fi to the $2^{nd}$ box, as shown in FIG. 3(c). This Wi-Fi extender is typically located within range of the $2^{nd}$ box, and closer to either the center of the house or the Wi-Fi devices that need better performance.

The cost of the 2-box solution is an assumed cost by the service provider for providing the Internet connectivity. 2-box solutions are more expensive than a single home gateway with integrated broadband connecting. However, one key benefit of the approach is to isolate the two technologies from each other. For instance, the broadband connectivity standard in use may not need to change for a long time (e.g., a 10 G fiber or cable connection), but Wi-Fi standards are changing all the time (e.g. Wi-Fi 5, 6, 6E, 7, etc.). In order to stay competitive, the operator in a 2-box setup can upgrade/replace the $2^{nd}$ box (HGW/router) to jump to the next Wi-Fi standard, keeping the $1^{st}$ box (WAN adaptor) "as-is". Service providers with integrated gateways however would have to replace the entire solution (10 G service) and Wi-Fi just to get the next version of Wi-Fi. If the 2-box solution cost is 20% more expensive than the integrated solution, the benefit is apparent on the next upgrade, where it may only cost 50% of what an integrated upgrade would cost.

In terms of the 2-box solution described above, the reliance on Ethernet connectivity may restrict positioning of the $2^{nd}$ box (the home gateway device or router). The ability to replace the Ethernet connection with a dedicated Wi-Fi connection (e.g., 6 GHz band), operating between the $1^{st}$ box and the $2^{nd}$ box as shown in FIG. 4(a), means that the $2^{nd}$ box (HGW/router) can be positioned more appropriately in a user's home for better Wi-Fi performance, potentially removing the need (and cost) of offering a Wi-Fi extender device as shown in FIG. 4(b) (i.e., $1^{st}$-box+Wi-Fi+$2^{nd}$-box is cheaper than $1^{st}$-box+Ethernet+$2^{nd}$-box+Wi-Fi+Extender). Another benefit of this approach is that the $2^{nd}$ box is usually the primary industrial design and brand recognition device that a service provider wants to be recognized. If the $2^{nd}$ box is hidden in a wiring cabinet, it may as well be a plain "utility" device, rather than a fashionable looking piece of electronics.

SUMMARY

There is a need to provide a system, methods and devices for optimizing traffic routing operations in a two-box WLAN setup, including a wide area network (WAN) adaptor device ($1^{st}$ box) and a home gateway device ($2^{st}$ box). This disclosure identifies the use of a Wi-Fi backhaul connection between a $1^{st}$ box and a $2^{nd}$ box (refer to FIG. 5), as well as the ability to operate home Wi-Fi networks (SSIDs) on the $1^{st}$ box through a hairpin arrangement with the $2^{nd}$ box router (refer to FIG. 7), and finally an optimization for reducing the Wi-Fi airtime usage when dealing with home Wi-Fi networks on the $1^{st}$ box (refer to FIG. 8).

An aspect of the present disclosure relates to a gateway device for optimizing traffic routing operations in a two-box wireless local area network (WLAN) setup. The gateway device includes a memory storing instructions, and a processor configured to execute the instructions to establish a dedicated wireless backhaul connection between the gateway device and a wide area network (WAN) adaptor device, receive initial packets of a traffic flow from a client device associated with the WLAN, via the WAN adaptor device, perform slowpath (SP) processing on the initial packets of the traffic flow, send the initial packets of the traffic flow to the WAN adaptor device for forwarding to the Internet based on the SP processing, create fastpath (FP) processing rules for the traffic flow, including traffic modifications resulting from the SP processing, and send the FP processing rules for the traffic flow to the WAN adaptor device for application to subsequent packets of the traffic flow.

Basically, the home gateway device ($2^{nd}$ box) is the platform that most operators concentrate all their networking services in. Operators go to great lengths to ensure features such as Parental Control or Security Services are concentrated in one location of the home. Reapplying the same identical processing of the home gateway device ($2^{nd}$ box) to other devices would require a significant amount of engineering effort on, for example, Wi-Fi extenders in order to have the same level of functionality of the home gateway device ($2^{nd}$ box) as well as potentially require the introduction of another device in the home with a separate software stack maintained in lock-step with the home gateway device ($2^{nd}$ box). In an aspect of the present disclosure, the FP processing of the home gateway device ($2^{nd}$ box) is duplicated or copied to the WAN adaptor device to optimize traffic routing operations in the WLAN, without the overhead of having to move all the functionality of the home gateway device ($2^{nd}$ box).

In another aspect of the present disclosure, the processor of the gateway device is further configured to identify the traffic modifications resulting from the SP processing on the initial packets of the traffic flow, wherein the traffic modifications include rewriting a source Layer 2 media access control (L2 MAC) address of the traffic flow to match a wide area network (WAN) MAC address of the gateway device.

In another aspect of the present disclosure, the FP processing rules for the traffic flow that are created and sent by the gateway device enable the WAN adaptor device to perform the traffic modifications on the subsequent packets of the traffic flow, and forward the subsequent packets of the traffic flow to the Internet directly, without bridging the subsequent packets of the traffic flow to the gateway device for FP processing.

In another aspect of the present disclosure, the FP processing rules for the traffic flow may include policies directed to what data traffic may take advantage of FP processing.

In another aspect of the present disclosure, the processor is further configured to execute the instructions to receive initial packets of a second traffic flow from the Internet, via the WAN adaptor device, perform SP processing on the initial packets of the second traffic flow, send the initial packets of the second traffic flow to the WAN adaptor device for forwarding to the client device based on the SP processing, create FP processing rules for the second traffic flow, including traffic modifications resulting from the SP processing, and send the FP processing rules for the second traffic flow to the WAN adaptor device for application to subsequent packets of the second traffic flow.

In another aspect of the present disclosure, the FP processing rules for the second traffic flow that are created and sent by the gateway device enable the WAN adaptor device to perform the traffic modifications on the subsequent packets of the second traffic flow, and forward the subsequent packets of the traffic flow to the Internet directly, without bridging the subsequent packets of the second traffic flow to the gateway device for FP processing.

An aspect of the present disclosure relates to a wide area network (WAN) adaptor device for optimizing traffic routing operations in a two-box wireless local area network (WLAN) setup. The WAN adaptor device includes a memory storing instructions, and a processor configured to execute the instructions to establish a dedicated wireless backhaul connection between the WAN adaptor device and a gateway device, receive initial packets of a traffic flow from a client device associated with the WLAN, send the initial packets of the traffic flow to the gateway device for slowpath (SP) processing, receive the initial packets of the traffic flow from the gateway device, and forward the initial packets to the Internet based on the SP processing, receive fastpath (FP) processing rules for the traffic flow from the gateway device, and apply the FP processing rules to subsequent packets of the traffic flow to perform traffic modifications on the subsequent packets of the traffic flow.

In another aspect of the present disclosure, the traffic modifications to the subsequent packets of the traffic flow include rewriting a source Layer 2 media access control (MAC) address of the traffic flow to match a WAN MAC address of the gateway device.

In another aspect of the present disclosure, as a result of applying the FP processing rules for the traffic flow that are received from the gateway device, the WAN adaptor device forwards the subsequent packets of the traffic flow to the Internet directly, without bridging the subsequent packets of the traffic flow to the gateway device for FP processing.

In another aspect of the present disclosure, the processor of the WAN adaptor device is further configured to execute the instructions to receive initial packets of a second traffic flow from the Internet, send the initial packets of the second traffic flow to the gateway device for SP processing, receive the initial packets of the second traffic flow from the gateway device, and forward the initial packets to the client device based on the SP processing, receive FP processing rules for the second traffic flow from the gateway device, and apply the FP processing rules to subsequent packets of the second traffic flow to perform traffic modifications on the subsequent packets of the second traffic flow.

In another aspect of the present disclosure, as a result of applying the FP processing rules for the second traffic flow that are received from the gateway device, the WAN adaptor device forwards the subsequent packets of the second traffic flow to the client device directly, without bridging the subsequent packets of the second traffic flow to the gateway device for FP processing.

An aspect of the present disclosure relates to methods for optimizing traffic routing operations in a two-box WLAN setup including a gateway device and a WAN adaptor device. The methods may include the steps performed by the gateway device and the WAN adaptor device, respectively, as described above.

An aspect of the present disclosure relates to non-transitory computer-readable media storing programs of instructions for optimizing traffic routing operations in a two-box WLAN setup including a gateway device and a WAN adaptor device, the instructions when executed by processors of the gateway device and the WAN adaptor device causing these devices to perform operations, respectively, including the operations described above.

Another aspect of the present disclosure relates to a system including the gateway device, the WAN adaptor device, and one or more client devices.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
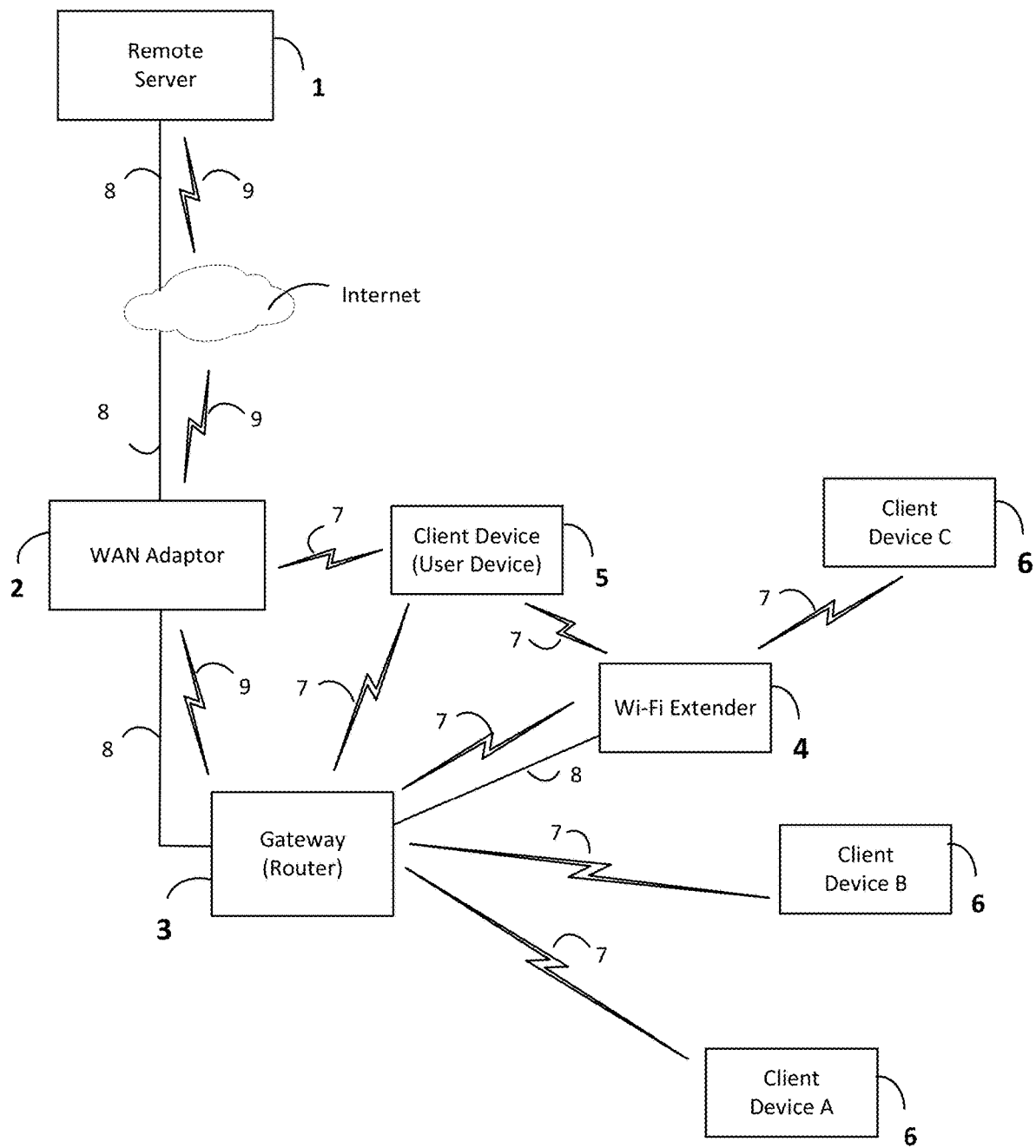
FIG. 1 illustrates an example system of devices in a network environment, including at least a gateway device, a WAN adaptor device, and one or more client device(s), according to some example embodiments.

FIG. 1 illustrates an example system of devices in a network environment, including at least a server device, a WAN adaptor device, a gateway device, and one or more client device(s), according to some example embodiments.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the system includes a gateway device 3 (also referred to as a home gateway device (HGW), a wireless access point (AP), a router, or the like) that is in wired or wireless communication with one or more server device(s) 1 via a wide area network (WAN) adaptor 2 over a WAN connection (also referred to as the Internet), and that is in wireless communication with one or more client devices 5, 6 (e.g., via a wireless local area network (WLAN), also referred to as a home Wi-Fi network). The gateway device 3 connects to the Internet (WAN) by any known manner (e.g., cable (DOCSIS), fiber, or by wireless such a 5 G).

As shown in FIG. 1, the one or more server device(s) 1 may be, for example, one or more remote computers, and may include or may be in communication with one or more databases and/or cloud repositories (not shown in FIG. 1) that may store various different forms of data and instructions. The remote server(s) 1 may be responsible for performing different functions of the methods described herein in connection with the gateway device 3 (router) and/or the WAN adaptor device 2. The server(s) 1 may also include remote computing devices that provide the network devices with access to various web services over the Internet.

As shown in FIG. 1, the wide area network (WAN) adaptor device 2 can be a hardware electronic device that provides an interface between the Internet and the gateway device 3. The WAN adaptor device 2 may also be referred to as or may include an embedded multimedia terminal adaptor (eMTA), an optical network unit (ONU), and/or a wireless extender generally (e.g., an M6 Wi-Fi extender device, as a non-limiting example).

As shown in FIG. 1, the gateway device 3 can be, for example, a hardware electronic device that may be a combination modem and network gateway device that combines the functions of a modem, and access point (AP), and/or a router for communicating traffic between the network devices and the Internet. The gateway device 2 may also be referred to as a residential gateway (RG), a broadband access gateway, a home network gateway (HMV), a wireless router, or a wireless AP.

As shown in FIG. 1, the system may (optionally) include a wireless (Wi-Fi) extender 4. The Wi-Fi extender 4 can be, for example, a hardware electronic device such as an access point (AP) used to extend a wireless network by receiving the signals transmitted by the gateway device 3 and rebroadcasting the signals to client devices 5, 6, which may be out of range of the gateway device 3. The Wi-Fi extender 4 can also receive signals from the client devices 5, 6 and rebroadcast the signals to the gateway device 3 or other client devices 5, 6. For example, some client devices that are out of wireless communication range of the gateway device 3 can connect to the Internet/WAN via a wireless connection with the Wi-Fi extender 4, which has a wired or wireless connection with the gateway device 3. However, the Wi-Fi extender 4 may not be required according to some example embodiments described herein.

As shown in FIG. 1, the client devices may include a user device 5 (e.g., a mobile device such as a smartphone, or a computer, a laptop, a tablet, etc.) and one or more other devices 6 (e.g., devices A, B, and C). The client devices 6 may include various types of electronic devices including but not limited to computers, hand-held computing devices, electronic tablets, smartphones, smart speakers, lights, televisions, set-top boxes (STBs), appliances, iControl devices, Internet of Things (IoT) devices, etc. that are present in the user's home Wi-Fi network, and are capable of connecting to the Internet, cellular networks, and interconnecting with other devices via Wi-Fi and Bluetooth, or other wireless consumer electronic devices capable of executing and displaying content.

The wireless connection(s) 7 between the gateway device 3 and the client devices 5, 6 can be implemented using a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally or alternatively, the wireless connection 7 can be implemented using a wireless connection that operates in accordance with, but is not limited to, RF4CE protocol, ZigBee protocol, Z-Wave protocol, or IEEE 802.15.4 protocol. The client devices 5, 6 may similarly establish a wireless connection 7 with the Wi-Fi extender 4 and/or the WAN adaptor device 2 (e.g., eMTA/M6).

The wired connection 8 and/or the wireless connection 9 between the gateway device 3, the WAN adaptor 2, and/or the remote server device(s) 1 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2 G, 3 G, 4 G or 5 G network, for example. The wireless connection 9 can further include as some portion thereof a broadband mobile phone network connection, an optical network connection, or other similar connections. For example, the wireless connection 9 can also be implemented using a fixed wireless connection that operates in accordance with, but is not limited to, 3rd Generation Partnership Project (3GPP) Long Term Evolution (LTE) or 5 G protocols.

Figure 2:
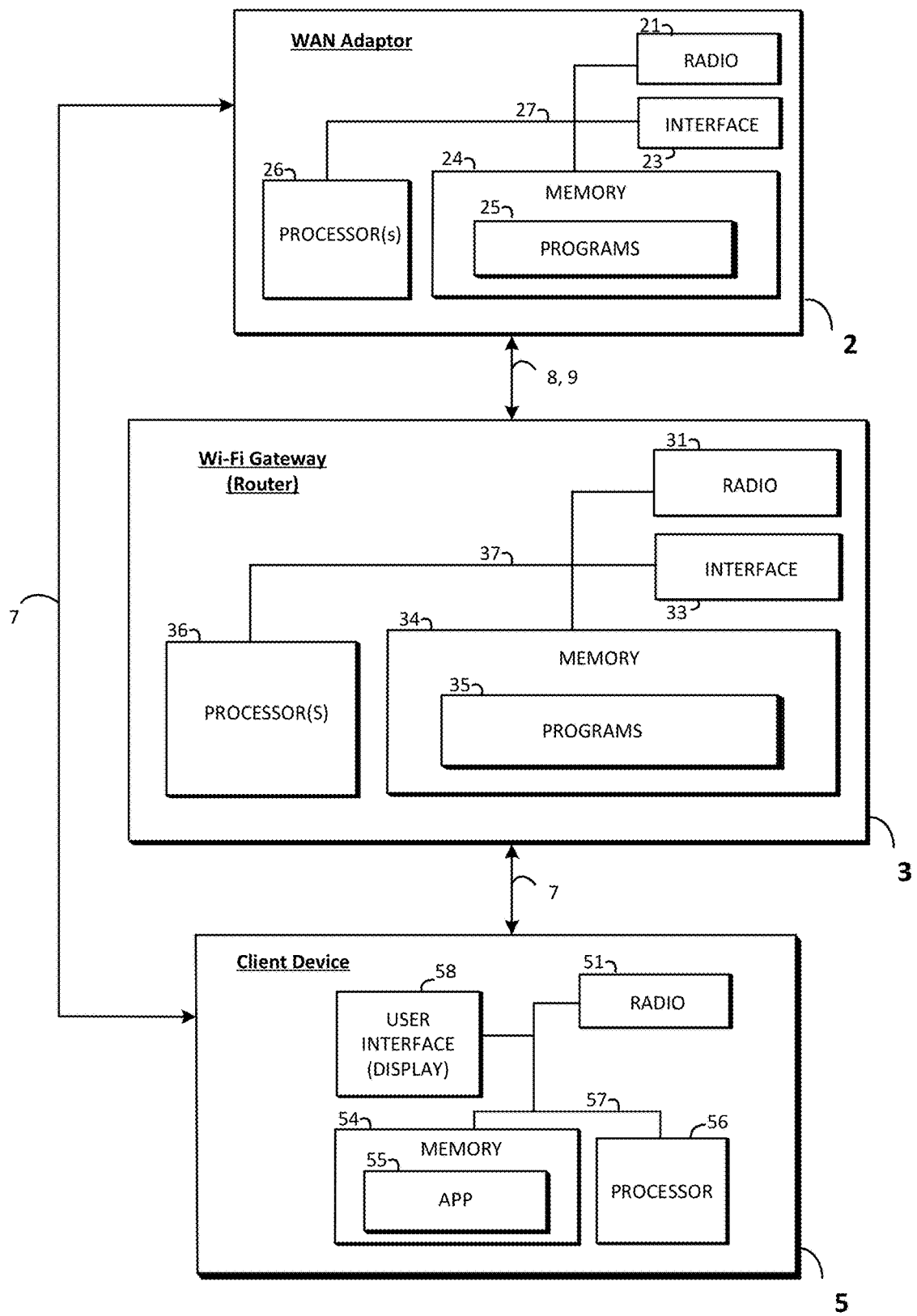
FIG. 2 illustrates various structural components (combinations of hardware and software) of the gateway device, the WAN adaptor device, and the client device(s) of FIG. 1, according to some example embodiments.

A more detailed description of the exemplary internal components of the WAN adaptor device 2, the gateway device 3 (router), and the client devices 5, 6 shown in FIG. 1 will be provided in the discussion of FIG. 2. However, in general, it is contemplated by the present disclosure that the servers device(s) 1, the WAN adaptor device 2, the gateway device 3 (router), and the client devices 5, 6 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the server device(s) 1, the WAN adaptor device 2, the gateway device 3 (router), and the client devices 5, 6 may be adapted to execute any operating system, including Linux, UNIX, Windows, MacOS, DOS, and ChromeOS as well as virtual machines adapted to virtualize execution of a particular operating system, including customized and proprietary operating systems. The server device(s) 1, the WAN adaptor device 2, the gateway device 3, and the client devices 5, 6 are further equipped with components to facilitate communication with other computing devices over the one or more network connections to local and wide area networks, wireless and wired networks, public and private networks, and any other communication network enabling communication in the system.

FIG. 2 illustrates various structural components (combinations of hardware and software) of the WAN adaptor device, the gateway device, and the client device(s) of FIG. 1, according to some example embodiments.

As shown in FIG. 2, the WAN adaptor device 2 may include one or more processor(s) 26, a memory 24 having stored thereon one or more programs 25 (and data), an interface 23 for connecting to the Internet (e.g., a wired or wireless WAN interface), (optionally) a radio 21 for implementing wireless 5 G communication to the Internet (WAN), and a bus 27 for enabling internal connections and communications between the various components of the WAN adaptor device 2. In some example embodiments, the WAN adaptor device 2 may be implemented via an embedded MTA (eMTA), an optical network unit (ONU), an M6 extender device, or various other non-limiting equivalent devices that have been modified to have wireless AP capabilities embedded therein. The terminology used to refer to a WAN adaptor device may vary depending on the communications protocols being used for the wired and/or wireless connections in the network system (such as DOCSIS/coax cable connections, xPON/fiber optic connections, fixed wireless access (FWA) or 5 G cellular connections, for example). The WAN adaptor device 2 may also be referred to herein as a wireless extender or Wi-Fi Extender, generally.

The radio 21 and the interface 23 may include various network cards, and circuitry implemented in software and/or hardware to enable communications between the server device(s) 1, the WAN adaptor device 2, and the gateway device 3 via the Internet (e.g., WAN) using the wired and/or wireless protocols in accordance with connections 8 and/or 9 (as described with reference to FIG. 1). The radio 21 may also enable communications with the client devices 5, 6 via connection 7 (as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including one or more programs 25 for controlling the general functions and operations of the WAN adaptor device 2 and performing management functions related to the other devices (e.g., client devices 5, 6) in the network in accordance with the embodiments described in the present disclosure.

The one or more processor(s) 26 control(s) the general operations of the WAN adaptor device 2 as well as performs management functions related to the other devices (e.g., client devices 5, 6) in the network. The processor(s) 26 can include, but is/are not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the programs 25 for controlling the operation and functions of the WAN adaptor device 2 in accordance with the embodiments described in the present disclosure.

The gateway device 3 of the system of FIG. 1 can include, for example, a hardware electronic device that can combine the functions of a modem, an access point (AP), and/or a router for providing content received from the Internet (WAN) to network devices (e.g., client devices 5, 6) in the system. It is also contemplated by the present disclosure that the router device 3 can include the function of, but is not limited to, an IP/QAM STB or SMD that is capable of decoding audio/video content, and playing OTT or MSO provided content. The gateway device 3 may also be referred to as a residential gateway (RG), a home gateway (HGW), a broadband access gateway, or the like.

As shown in FIG. 2, the gateway device 3 (router) includes one or more processor(s) 36, a memory 34 having stored thereon one or more programs 35 (and data), an interface 33 for connecting to the Internet (e.g., a wired or wireless WAN interface), at least one radio 31 for implementing Wi-Fi communication in the WLAN (and optionally for implementing wireless 5 G communication to the Internet/WAN), and a bus 37 for enabling internal connections and communications between the various components of the gateway 3.

The at least one radio 31 may include various network cards, and circuitry implemented in software and/or hardware to enable communications with the server(s) 1, the WAN adaptor 2, and the client devices 5, 6 using the communication protocols in accordance with connections 7, 8, and/or 9 (as described with reference to FIG. 1). The at least one radio 31 may be configured to operate in at least one radio frequency (RE) band (e.g., 2.4 GHz, 5 GHz, 6 GHz, 60 GHz, etc.), and may include multiple radios each operating in a different RF band.

The interface 33 may include various network cards, and circuitry implemented in software and/or hardware to enable communications between the gateway device 3 and the server device(s) 1 via the WAN adaptor 2 (e.g., eMTA/M6) over the Internet/WAN, using the wired and/or wireless protocols in accordance with connections 7, 8, and/or 9 (as described with reference to FIG. 1).

The memory 34 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 34 can be used to store any type of instructions, software, or algorithm including one or more programs 35 for controlling the general functions and operations of the gateway device 3 and performing management functions related to the other devices (e.g., the WAN adaptor device 2 and/or the client devices 5, 6) in the network in accordance with the embodiments described in the present disclosure.

The one or more processor(s) 36 control(s) the general operations of the gateway device 3 as well as performs management functions related to the other devices (e.g., the WAN adaptor device 2 and/or the client devices 5, 6) in the network. The processor(s) 36 may also be referred to as a gateway access point (AP) wireless resource controller. The processor(s) 36 can include, but is/are not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the programs 35 for controlling the operation and functions of the gateway device 3 in accordance with the embodiments described in the present disclosure.

The client devices (e.g., the user device 5 and/or the other devices 6) of the system of FIG. 1 can include, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the router device 3. Additionally, the client devices 5, 6 can include a TV, an IP/QAM STB, or an SMD that is capable of decoding audio/video content, and playing over OTT or MSO provided content received through the router device 3.

As shown in FIG. 2, the client device 5 may include at least one processor 56, a memory 54 having stored thereon one or more applications 55 (apps, programs, and data), at least one radio 51 for implementing Wi-Fi communication with the gateway device 3 and/or the WAN adaptor device 2 (and for implementing wireless 4 G and/or 5 G communication to the Internet), and a bus 57 for enabling internal connections and communications between the various components of the client device 5.

The at least one radio 51 can include, but is not limited to, various network cards, and circuitry implemented in software and/or hardware to enable communications with the gateway device 3, the WAN adaptor device 2, and/or the Wi-Fi extender 4 using the communication protocols in accordance with connection 7 (as described with reference to FIG. 1). The at least one radio 51 may be configured to operate in at least one radio frequency (RF) band (e.g., 2.4 GHz, 5 GHz, 6 GHz, 60 GHz, etc.).

The memory 54 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 54 can be used to store any type of instructions, software, or algorithms including programs and/or applications 55 for controlling the general function and operations of the client device 5 in accordance with the embodiments described in the present disclosure.

The at least one processor 56 controls the general operations of the client device 5 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the applications 55 for controlling the operation and functions of the client device 5 in accordance with the embodiments described in the present disclosure.

At least one of the client devices of FIG. 1, such as the user device 5 e.g., a mobile device such as a smartphone), may include a user interface 58, such as a display screen (e.g., which may present a graphical user interface (GUI)), for outputting information to and/or receiving input from the user. The user interface 58 (display) includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 5.

One or more of the other client devices of FIG. 1, such as the other devices 6 (e.g., devices A, B, C) (not shown in FIG. 2) may include similar components as the client device 5 (e the user device) of FIG. 2. In contrast to the client: device 5 (e.g., the user device) of FIG. 2, however, at least one of the other devices 6 (devices A, B, C) may have limited user-interface capabilities (e.g., no displays, touch screens, or GUIs) and/or may have some specific dedicated functionality (e.g., speakers, lights, appliances, IoT devices, etc.).

Figure 3:
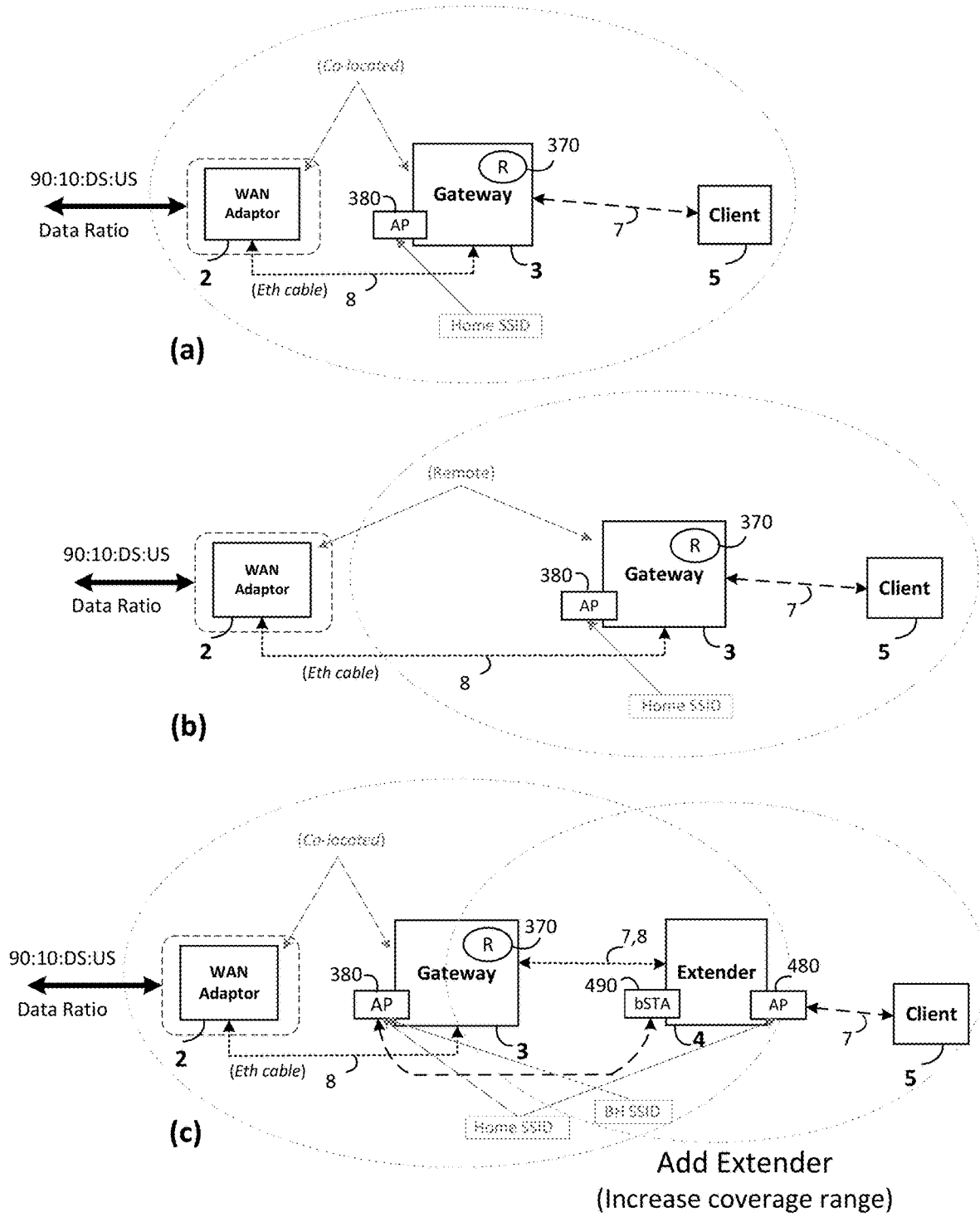
FIG. 3 illustrates various examples of Home Wi-Fi Network Setups between the gateway device, the WAN adaptor device, the extender device, and the client device(s) of FIG. 1.

FIG. 3 illustrates various examples of Home Wi-Fi Network Setups between the gateway device, the WAN adaptor device, the extender device, and the client device(s) of FIG. 1.

In an example setup, for a DOCSIS network, WAN adaptor device 2 ($1^{st}$ box) is co-located with a home gateway device (HGW) 3 ($2^{nd}$ box), as shown in FIG. 3(a). Clients 5 connect to the Home SSID provided by the HGW 3.

It is possible to relocate the HGW 3 ($2^{nd}$ box) to a remote location, away from the WAN adaptor 2 ($1^{st}$ box), via structured Ethernet cabling or a long Ethernet cable, as shown in another example setup in FIG. 3(b). This helps to position the home gateway Wi-Fi closer to Wi-Fi clients 5.

In a modification of the first example setup above, where the WAN adaptor 2 and the HGW 3 (both the $1^{st}$ and $2^{nd}$ boxes) are co-located, a Wi-Fi extender 4 must be deployed in order to solve range issues to reach the distant Wi-Fi clients 5, as shown in FIG. 3(c). The Wi-Fi extender 4 connects to the HGW 3 using a dedicated Wi-Fi Backhaul link (BH SSID). This extension is one way to provide whole-home wireless network coverage. However, an alternative way of doing so will be described below with reference to FIG. 4.

Figure 4:
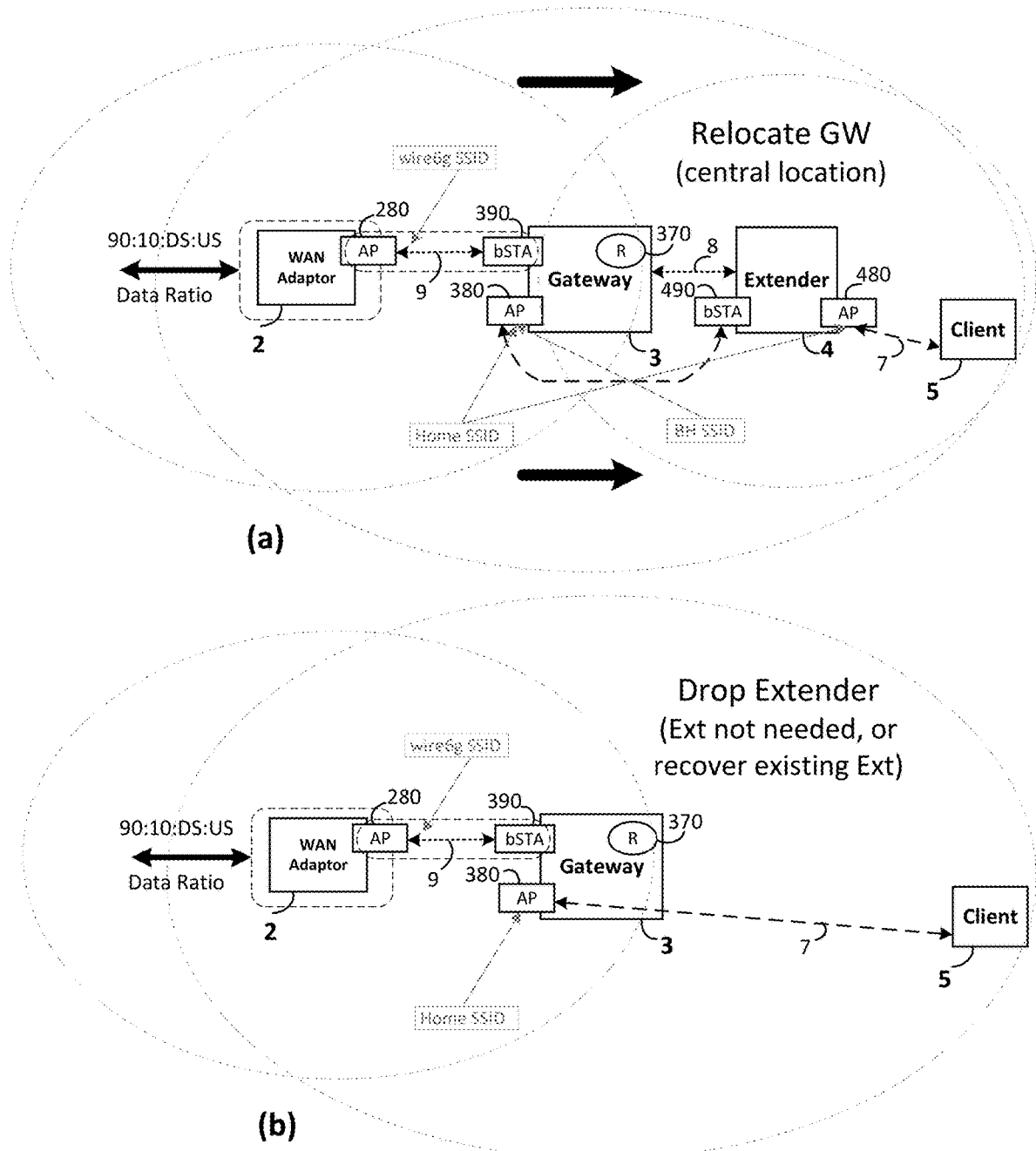
FIG. 4 illustrates an example of replacing the wired connection (e.g., Ethernet) between the WAN adaptor device and the gateway device with a 6 GHz wireless connection, according to some example embodiments.

FIG. 4 illustrates an example of replacing the wired connection (e.g., Ethernet) between the WAN adaptor device and the gateway device with a 6 GHz wireless connection, according to some example embodiments;

This disclosure identifies how to replace the typical Ethernet connection between the WAN adaptor device 2 and the home gateway device (HGW) 3 (the $1^{st}$ and $2^{nd}$ boxes) with a Wi-Fi link (wire6g SSID). This is achieved by embedding a Wi-Fi radio system in the $1^{st}$ box (WAN adaptor 2) that can communicate with the $2^{nd}$ box (HGW 3).

The diagram of FIG. 4(a) shows an example AP 280 function in the $1^{st}$ box and a bSTA 390 function in the $2^{nd}$ box. This can also be setup as a bSTA function in the $1^{st}$ box and an AP function in the $2^{nd}$ box, as described further below with reference to FIG. 5. The bias of Downstream to Upstream traffic to a home may influence the choice of what function (AP or bSTA) goes where ($1^{st}$ or $2^{nd}$ box). FIG. 4(a) shows the ethernet cable being replaced with Wi-Fi, and the example coverage area that is available from the $1^{st}$ box and the $2^{nd}$ box Wi-Fi radio subsystems. As a result of this Wi-Fi coverage, the $2^{nd}$ box can be relocated remotely from the $1^{st}$ box (e.g., the HGW 3 can be located more centrally in the home), resulting in sufficiently improved coverage that the $2^{nd}$ box can offer Wi-Fi service to the client connecting to the Wi-Fi extender 4. The WAN adaptor 2 ($1^{st}$ box) Wi-Fi connection operates as a layer 2 bridge interface connecting the external WAN connection of the WAN adaptor 2 to the WAN interface of the HGW 3 ($2^{nd}$ box). No routing occurs between these interfaces. The WAN adaptor 2 ($1^{st}$ box) does not offer any home Wi-Fi networks to the client devices 5 in this example setup, relying instead on the HGW 3 and/or the Wi-Fi extender 4 to perform that function.

As a result of the improved coverage offered by the relocated HGW 3 ($2^{nd}$ box), there is no longer any real reason for having to operate a Wi-Fi extender 4 to increase range or additional coverage in many home network environments, and thus the Wi-Fi extender 4 can be dropped from this example network setup (an extender is not needed when setting up this home network, or else an existing extender already deployed in the field can be recovered), as shown in FIG. 4(b). In fact, if a Wi-Fi extender 4 is used, then Wi-Fi clients 5 need three hops instead of just two to get to the Internet connection, increasing latency and reducing airtime for all other users. Thus, the extended coverage provided by the HGW 3 in the network setup of FIG. 4(b) can eliminate the need for a Wi-Fi extender 4 while still providing whole home coverage, and there would also be no need to install/pull Ethernet cable throughout the home.

Figure 5:
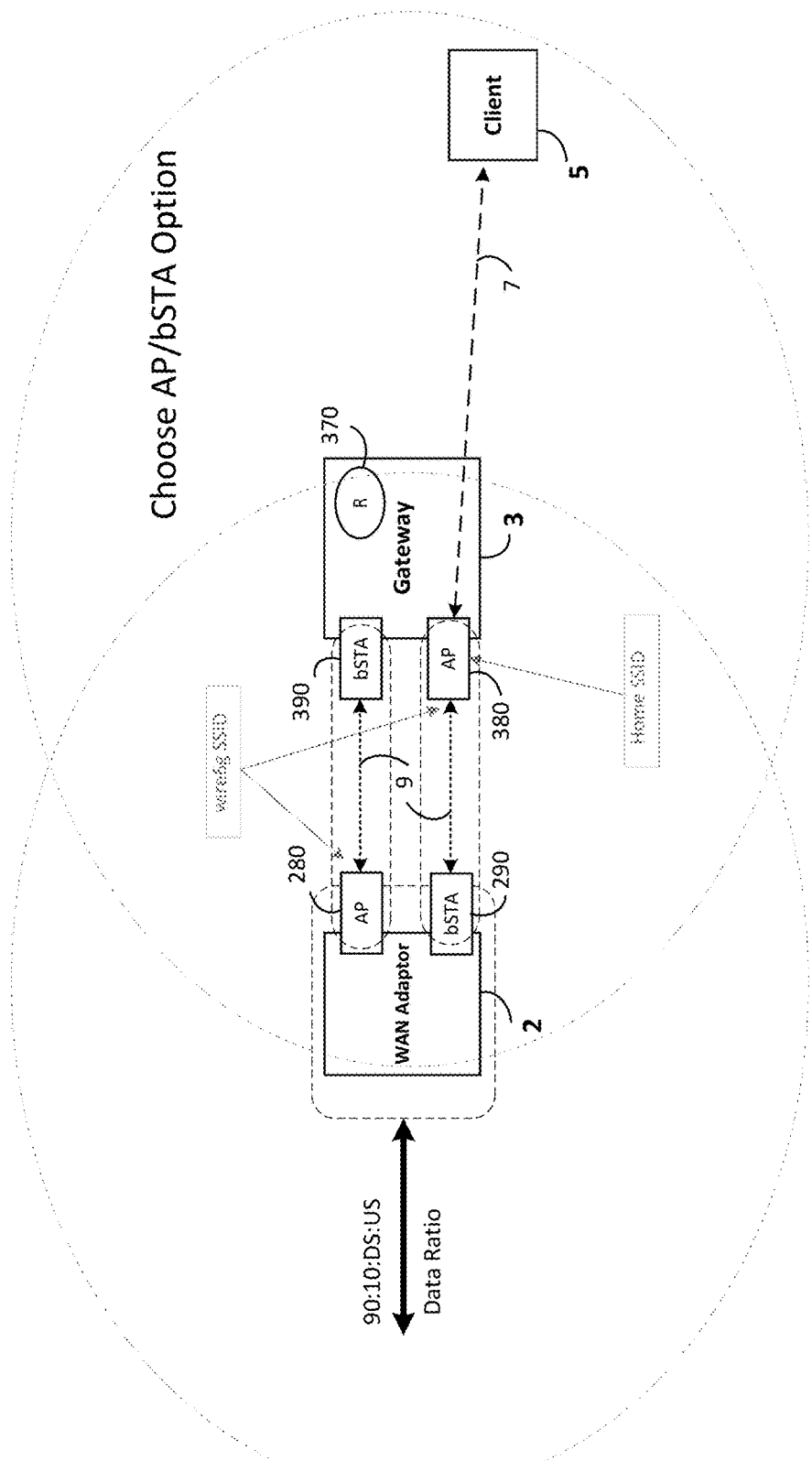
FIG. 5 illustrates an example of 6 GHz options between the WAN adaptor device and the gateway device, according to some example embodiments.

FIG. 5 illustrates an example of 6 GHz options between the WAN adaptor device and the gateway device, according to some example embodiments;

As mentioned above, it may be possible to offer different Wi-Fi connection options (e.g., AP vs. bSTA) between the WAN adaptor 2 and the HGW 3 (the $1^{st}$ and $2^{nd}$ boxes). FIG. 5 shows both of these options (e.g., AP vs. bSTA). In some example embodiments, the WAN adaptor 2 ($1^{st}$ box) may be configured with an AP 280 function and the HGW 3 may be configured with a bSTA 390 function. In some other example embodiments, the WAN adaptor 2 ($1^{st}$ box) may be configured with a bSTA 290 function and the HGW 3 may be configured with an AP 380 function. This may depend on the bias of Downstream traffic to Upstream traffic, for example.

Note that it may also be an option to operate both an AP function and a bSTA function on both the $1^{st}$ and $2^{nd}$ boxes at the same time, depending on what radio setup is considered. Also note that with advances in Wi-Fi 6 OFDMA in downstream and upstream, scheduling of traffic between the two boxes as well as by the HGW 3 ($2^{nd}$ box) for connecting clients 5, is likely to make a notable difference to the performance of the solution described herein. Such scheduling may also influence whether the HGW 3 ($2^{nd}$ box) handles scheduling for this link or not. If this option is taken up (AP/bSTA operating on both boxes, using different SSID names, respectively), then a bridging model for ensuring downstream traffic passes over the WAN adaptor AP 280, and upstream traffic passes over the HGW AP 380, according to some example embodiments.

Figure 6:
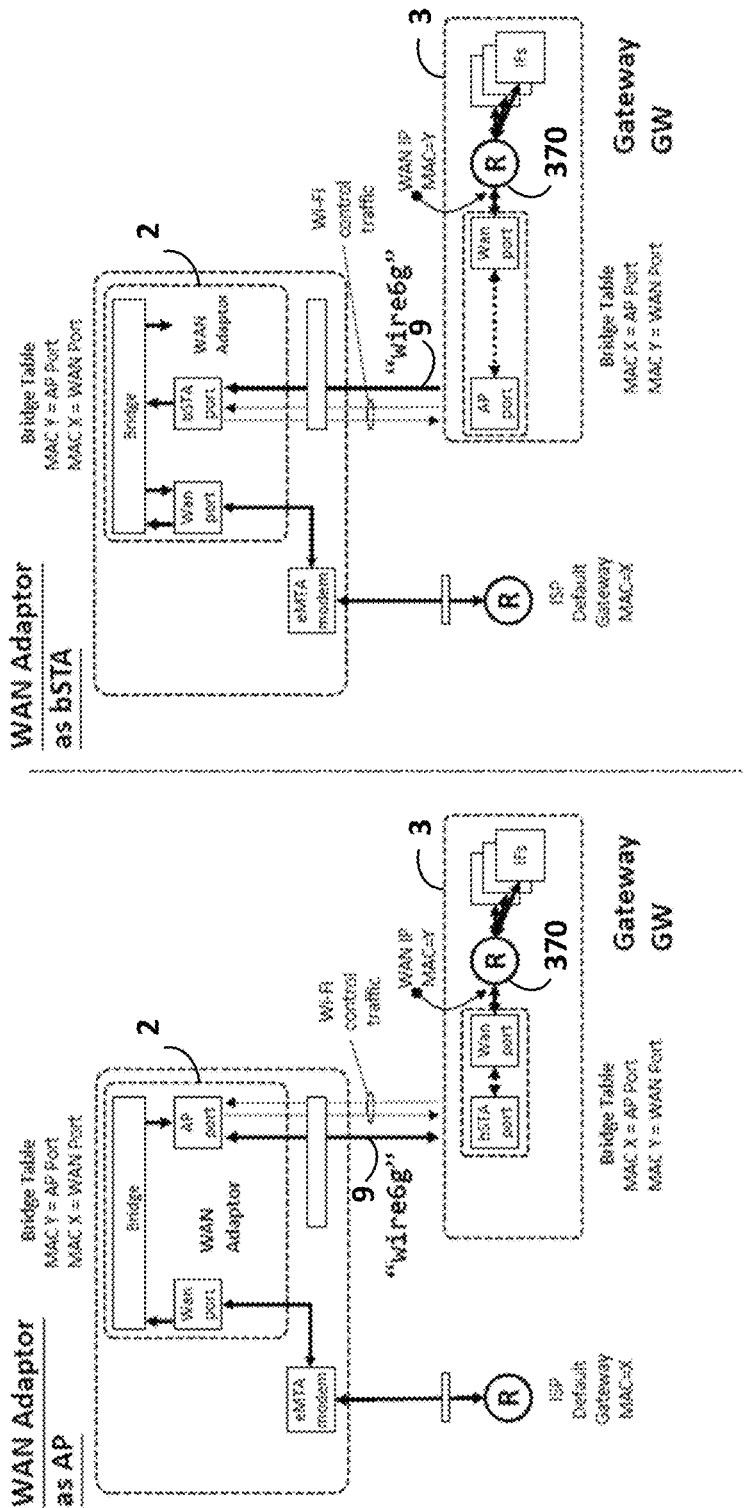
FIG. 6 illustrates examples of the WAN adaptor device configured as an access point (AP) and as a base station (bSTA), respectively, according to some example embodiments.

FIG. 6 illustrates examples of the WAN adaptor device configured as an access point (AP) and as a base station (bSTA), respectively, according to some example embodiments.

FIG. 6 shows additional details about the organization of the $1^{st}$ box and the $2^{nd}$ box, according to some example embodiments. In one example setup, FIG. 6(a) shows the WAN adaptor device 2 (e.g., eMTA, M6, ONU, Wi-Fi Ext, etc.) configured as an access point (AP). In another example setup, FIG. 6(b) shows the WAN adaptor device 2 configured as a base station (bSTA).

The description so far only talks about the Home Wi-Fi networks being offered to the client devices 5, 6 by the HGW 3 ($2^{nd}$ box), but it is conceivable to think that the WAN adaptor device 2 ($1^{st}$ box) could also offer such networks to the Wi-Fi clients, as described below with reference to FIGS. 7-8.

Figure 7:
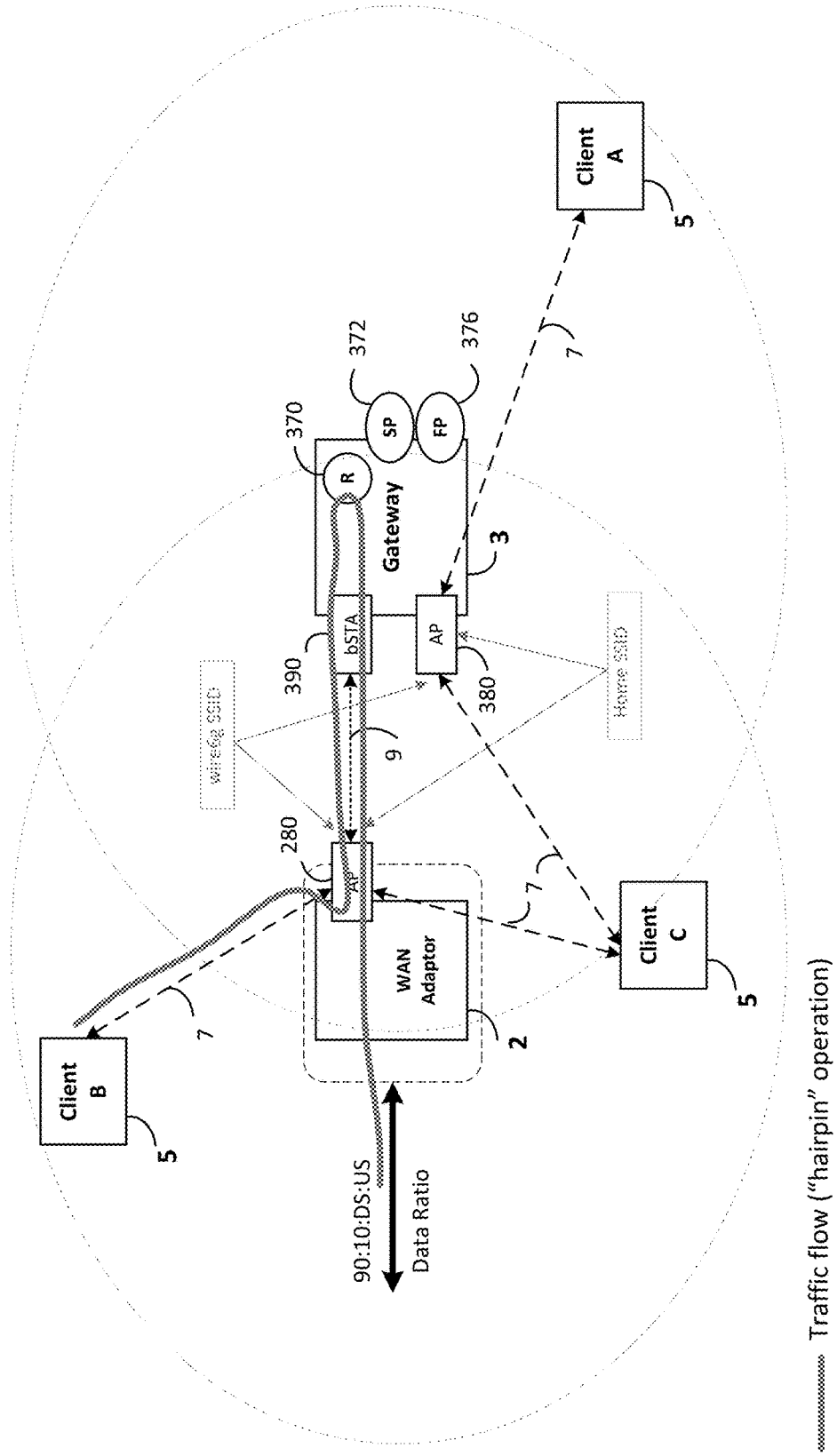
FIG. 7 illustrates an example of a traffic hairpin operation, where the Home SSID is added to the WAN adaptor device as well as the gateway device, according to some example embodiments.

FIG. 7 illustrates an example of a traffic hairpin operation, where the Home SSID is added to the WAN adaptor device as well as the gateway device, according to some example embodiments.

By adding the "Home SSID" to the WAN adaptor device 2 ($1^{st}$ box), as well as the home gateway device (HGW) 3 ($2^{nd}$ box), both of the WAN adaptor device 2 and the HGW 3 can function as an access point (AP) for the client devices 5, 6, depending on their proximity to each other. For example, extender tunneling techniques could be utilized in the WAN adaptor 2 for the Home SSID back to the HGW 3, allowing similar network operation as if a wireless extender (e.g., Wi-Fi extender 4 of FIGS. 1 and 3(c)) was deployed in the network environment of FIG. 7. This technique provides enhanced wireless network coverage (increase range and/or eliminate extender), but requires a traffic "hairpin" operation as described further below.

In the example setup of FIG. 7, among the three client devices 5, client A may be closest to the gateway device (HGW) 3 and connect with its AP 380, client B may be closest to the WAN adaptor device 2 and connect with its AP 280, and client C may be between or near both devices and can choose to connect with the WAN adaptor device 2 via its AP 280 or the home gateway device (HGW) 3 via its AP 380 and/or may switch between their APs 280, 380 as client C moves in the network environment (as the user moves their wireless device(s) through the home).

One complication of this model is that because the residential gateway device is effectively the "center of the universe" for all things routing in the home, traffic from a home Wi-Fi network operating on the WAN adaptor device 2 ($1^{st}$ box) would ordinarily need to be hairpinned to the HGW 3 ($2^{nd}$ box) for router handling by the router 370. As can be seen in the diagram of FIG. 7, such a setup would require client traffic to be sent three times over Wi-Fi before getting to the Internet, impacting latency and airtime usage in the home. The hairpin-shaped light line in the diagram of FIG. 7 shows how this traffic progresses through the network setup.

There are also two additional elements in the diagram of FIG. 7, the Slowpath (SP) 372 and the Fastpath (FP) 376. Typically, network traffic must be fully processed by the HGW 3 before it can be forwarded to the Internet. To assist performance, most residential gateway devices operate with packet acceleration (either software or hardware based), which means that the Slowpath processing (SP 372) is performed by the HGW 3 once (on initial packets of a network traffic flow (defined typically by a 5-tuple)), and packet modification instructions for this particular flow are handed off to an acceleration engine for Fastpath treatment (FP 376).

However, it is not optimal for the traffic of the client device 5 (client B) that is closest to the WAN adaptor device 2 to go through both the WAN adaptor device 2 and the HGW 3 because this adds extra hops each time, and this inefficiency/delay can quickly add up over the course of a session. Therefore, the extra hops corresponding to the illustrated hairpin operation present an opportunity to improve traffic routing and delivery for Wi-Fi client devices in the home.

In an effort to reduce this triple impact on the Wi-Fi network, aspects of the present disclosure describe an improved system, devices and methods for duplicating the Fastpath (FP) 376 processing that runs on the home gateway device (HGW) 3 to the WAN adaptor device 2, which can reduce this impact to just a single Wi-Fi exchange between the HGW 3 and the WAN adaptor device 2, as described with reference to FIG. 8 below.

Figure 8:
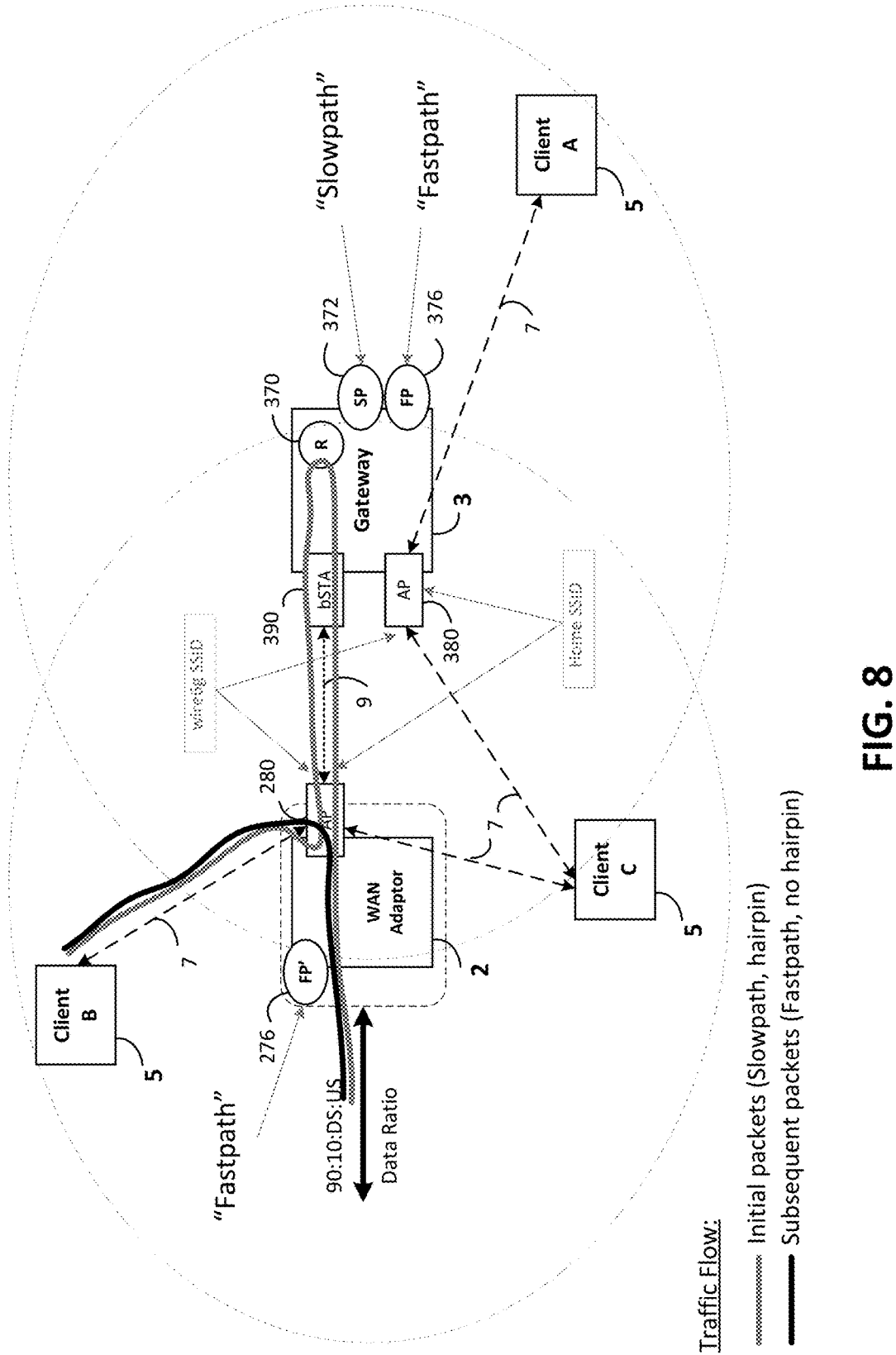
FIG. 8 illustrates an example of optimizing the traffic hairpin operation between the WAN adaptor device and the gateway device of FIG. 7, according to some example embodiments.

FIG. 8 illustrates an example of optimizing the traffic hairpin operation between the WAN adaptor device and the gateway device of FIG. 7, according to some example embodiments.

As mentioned above, the Slowpath/Fastpath operation is typically performed in residential gateways (e.g., HGW 3 with router function 370), especially for hardware (HW) offload. However, a process for duplicating the Fastpath (FP) processing of the HGW 3 onto the WAN adaptor device 2 can optimize traffic routing operations in the WLAN, according to aspects of the present disclosure described below.

In the example setup shown in FIG. 8, the home gateway device (HGW) 3 is hosting a home network Wi-Fi SSID, and the WAN adaptor device 2 is bridging this traffic as normal to the HGW 3. The setup involves the WAN adaptor device 2 taking the initial network packets from a new, previously unseen, traffic flow (defined by a minimum of IP 5-tuple) received from a client device 5 (e.g., client B in FIG. 8), and sending these initial packets of the traffic flow to the (HGW 3 for Slowpath (SP) 372 processing. Once the SP 372 processing is complete, these initial packets are sent by the HGW 3 through the WAN adaptor device 2 ($1^{st}$ box) to the Internet.

The HGW 3 also creates Fastpath (FP) 376 processing rules as a result of the SP 372 processing performed in the initial packets of the traffic flow. Ordinarily, these FP rules 376 would be applied by the HGW 3 to any subsequent packets sent on that traffic flow. However, according to an aspect of the present disclosure, the HGW 3 also signals the WAN adaptor device 2 those FP 376 processing rules that were created as a result of Slowpath processing on this traffic.

According to some example embodiments, the process for duplicating the Fastpath (FP) 376 processing of the HGW 3 ($2^{nd}$ box) includes identifying traffic modification(s) on the Slowpath (SP) 372 exchange between the WAN adaptor device 2 and the HGW 3 for initial packets of traffic flows. After the traffic modification(s) are identified, the HGW 3 updates the WAN adaptor device 2 with Fastpath (FP') 276 instructions, which are generated based on the identified traffic modification(s) resulting from the SP 372 processing.

The WAN adaptor device 2 installs Fastpath (FP') 276 processing rules received from the HGW 3, and applies the FP' rules 276 to any subsequent packets sent on that traffic flow. The WAN adaptor device 2 can then utilize the Fastpath (FP') 276 instructions received from the HGW 3 for processing subsequent packets of the traffic flows instead of the HGW 3 (that is, without requiring the hairpin operation between the two devices 2 and 3 for the traffic of client B in FIG. 8). As a result of the WAN adaptor device 2 receiving the FP' rules 276, the WAN adaptor device 2 no longer bridges this traffic to the HGW 3, and instead applies the traffic modification(s) of the FP' rules 276 to this identified traffic and forwards the subsequent packets of the traffic flow to the Internet.

The traffic modification(s) include rewriting the source L2 MAC of this traffic to match the WAN MAC address of the HGW 3, for example. The traffic modifications may include modifying IP headers of the packets (e.g., TTL, QoS settings, etc.), tunneling traffic by encapsulating a different format in a new IP packet, or the like. For example, when a packet is transformed, layer 3 information may be retained/preserved while layer 2 information may be remarked/modified accordingly. The traffic modification(s) can also include network address translation (NAT) processing, which results in the source IP and source TCP/UDP ports being modified. Additionally, the traffic modification(s) include IPv4/IPv6 transaction technologies like Dual-Stack (DS) LITE or Mapping of Address and Port using Translation (MAP-T), both of which will add an IPv6 header to existing IPv4 traffic.

The incoming traffic received from the Internet follows a similar path as the outgoing traffic received from the client 5, with the initial packets from unknown traffic flows being delivered by the WAN adaptor device 2 to the HGW 3 for SP 372 processing, and the HGW 3 forwarding FP' 276 processing rules back to the WAN adaptor device 2. Once the FP' 276 rules are installed, the WAN adaptor device 2 can transmit the traffic from the Internet directly to the client 5 (e.g., client B in FIG. 8), without resorting to the hairpin path to/from the HGW 3 again.

The hairpin-shaped light line in FIG. 8 shows the initial hairpin associated with SP 372 processing, while the curved dark line in FIG. 8 shows how traffic is sent and received once the FP' 276 processing rules are installed in the WAN adaptor device 2. It should be noted that after the FP' rules 276 are installed, any changes that may occur to the Slowpath processing (SP 372) performed by the HGW 3 can be used to invalidate the FP' 276 entries of the WAN adaptor device 2, forcing the WAN adaptor device 2 to hairpin traffic to/from the HGW 3 again until new Fastpath rules are supplied by the HGW 3.

Thus, when client devices 5 in the network are within wireless communication range of the WAN adaptor device 2, the client device 5 can wirelessly connect to the AP 280 of the WAN adaptor device 2, the initial packets of the traffic flows are forwarded to the HGW 3 via the wireless connection 9 (e.g., dedicated 6 GHz Wi-Fi Backhaul) for processing by Slowpath (SP) 372 of the HGW 3, while the subsequent packets of the traffic flows of such client devices 5 (e.g., client B) are processed by Fastpath (FP') 276 of the WAN adaptor device 2, without requiring the subsequent packets to be forwarded to the HGW 3 for FP processing.

In this manner, utilizing the duplicated Fastpath (FP') 276 instructions from the HGW 3, the WAN adaptor device 2 can forward the subsequent packets of the traffic flows between the Internet and the client device 5 (e.g., client B) directly, and the subsequent packets of the traffic flows for the client device 5 (client B) that is closest to the WAN adaptor device 2 in FIG. 8 do not need to take the extra hops to/from the HGW 3 in FIG. 8.

A similar process and traffic flow to optimize the hairpin operation and bypass the HGW 3 for subsequent packets of traffic flows can occur for other client devices 5 (e.g., client C) in the network when wirelessly connecting to AP 280 of the WAN adaptor device 2, instead of the AP 380 of the HGW 3 (e.g., due to a choice/command of a user, or device movement within the network environment). On the other hand, some other client devices 5 (e.g., client A) in the network that are within wireless communication range of the HGW 3, but are outside wireless communication range of the WAN adaptor device 2, would still have their traffic routed through both devices via the "hairpin" operation described with reference to FIG. 7, with both the initial packets and the subsequent packets of the traffic flows being processed by the Slowpath 372 and the Fastpath 376 of the HGW 3, respectively.

Additional specific implementation details of an operational approach associated with the above-described processes between the gateway device 3 and the WAN adaptor device 2 will be described below with reference to FIG. 9.

Figure 9:
FIG. 9 illustrates a flow chart of a method for optimizing traffic routing operations in a two-box wireless local area network (WLAN) setup, including the WAN adaptor device and the gateway device of FIG. 8, according to some example embodiments.

FIG. 9 shows a flowchart of a method for optimizing traffic routing operations in a two-box wireless local area network (WLAN) setup, including a WAN adaptor device and a home gateway device, according to some example embodiments.

Various steps of the methods may be performed by processors of the WAN adaptor device 2 and/or the gateway device 3, respectively, which execute instructions (e.g., programs, software, applications, logic, data processing, etc.) stored in their respective memories, as described above with reference to FIG. 2.

As shown in FIG. 9, the methods include establishing a dedicated wireless backhaul connection 9 between the WAN adaptor device 2 and the gateway device 3 (step S102), as described above with reference to FIGS. 4-8. This connection 9 is used to communicate traffic between the client devices 5, 6 and the Internet, as described below.

Outgoing traffic from the client device 5 (e.g., client B) to the Internet may take the following paths through the network devices.

The WAN adaptor device 2 receives initial packets of a traffic flow from a client device 5 associated with the WLAN (step S104), and sends the initial packets of the traffic flow to the gateway device 3 for slowpath (SP) processing (step S106).

The gateway device 3 receives the initial packets of the traffic flow from the client device 5 associated with the WLAN, via the WAN adaptor device 2 (step S108), and performs slowpath (SP) processing on the initial packets of the traffic flow (step S110). The gateway device 3 then sends the initial packets of the traffic flow to the WAN adaptor device 2 for forwarding to the Internet based on the SP processing (step S112).

According to aspects of the present disclosure, the gateway device 3 creates fastpath (FP) processing rules for the traffic flow, including traffic modifications resulting from the SP processing (step S114), and sends the FP processing rules for the traffic flow to the WAN adaptor device 2 for application to subsequent packets of the traffic flow (step S116).

In some example embodiments, the gateway device 3 identifies the traffic modifications resulting from the SP processing on the initial packets of the traffic flow. For example, the traffic modifications to the initial packets of the traffic flow include rewriting a source Layer 2 media access control (MAC) address of the traffic flow to match a WAN MAC address of the gateway device 3. The traffic modifications may include modifying IP headers of the packets (e.g., TTL, QoS settings, etc.), tunneling traffic by encapsulating a different format in a new IP packet, or the like. For example, layer 3 information may be retained/preserved, while layer 2 information may be remarked/modified. The traffic modification(s) can also include network address translation (NAT) processing, which results in the source IP and source TCP/UDP ports being modified. Additionally, the traffic modification(s) include IPv4/IPv6 transaction technologies like Dual-Stack (DS) LITE or Mapping of Address and Port using Translation (MAP-T), both of which will add an IPv6 header to existing IPv4 traffic.

The WAN adaptor device 2 receives the initial packets of the traffic flow from the gateway device 3 (step S118), and forwards the initial packets to the Internet based on the SP processing (step S120).

According to aspects of the present disclosure, the WAN adaptor device 2 receives the fastpath (FP) processing rules for the traffic flow from the gateway device 3 (step S122), installs them, and applies the FP processing rules to subsequent packets of the traffic flow to perform traffic modifications on the subsequent packets of the traffic flow (step S124). The FP rules may include one or more polices related to what data traffic may take advantage of the FP processing. As an example, the HGW 3 may apply certain traffic flow on the WAN adaptor device 2 based on a policy in the FP rule 376 related to, for example, VPN/Hot Spot traffic (e.g., such traffic would be required to hairpin from the WAN adaptor device 2 through the HGW 3 and back through the WAN adaptor device 2 to get to the Internet or WAN).

Additionally, the FP rules established in the HGW 3 may be timed-out, resulting in them being removed. In this case, the HGW 3 would notify the WAN adaptor 2 to remove any associated FP rules. A FP rule may be timed-out if, for example, an interface changes in the HGW 3, a protocol timeout, or a service stops running from the client and a certain FP rule is not longer required. It is contemplated by the present disclosure that the HGW 3 and the WAN adaptor device 2 can routinely perform "housing keeping" operations (e.g., updating, changing, or removing FP rules) so that HGW 3 and the WAN adaptor device 2 are kept synchronized.

As described above, the traffic modifications to the subsequent packets of the traffic flow include rewriting a source Layer 2 media access control (MAC) address of the traffic flow to match a WAN MAC address of the gateway device 3. The traffic modifications may include modifying IP headers of the packets (e.g., TTL, QoS settings, etc.), tunneling traffic by encapsulating a different format in a new IP packet, or the like. For example, layer 3 information may be retained/preserved, while layer information may be remarked/modified. The traffic modification(s) can also include network address translation (NAT) processing, which results in the source IP and source TCP/UDP ports being modified. Additionally, the traffic modification(s) include IPv4/IPv6 transaction technologies like Dual-Stack (DS) LITE or Mapping of Address and Port using Translation (MAP-T), both of which will add an IPv6 header to existing IPv4 traffic.

As a result of the gateway device 3 creating and sending the FP processing rules for the traffic flow, and the WAN adaptor device 2 applying the FP processing rules for the traffic flow that are received from the gateway device 3, the WAN adaptor device 2 can perform the traffic modifications on the subsequent packets of the traffic flow itself (using the duplicated FP processing rules), and forward the subsequent packets of the traffic flow to the Internet directly (S126), without bridging the subsequent packets of the traffic flow to the gateway device 3 for FP processing.

Although not shown in FIG. 9, incoming traffic from the Internet to the client device 5 (e.g., client B) may also follow a similar path through the network devices as the outgoing traffic.

The WAN adaptor device 2 receives initial packets of a second traffic flow from the Internet (step S204), and sends the initial packets of the second traffic flow to the gateway device 3 for SP processing (step S206).

The gateway device 3 receives the initial packets of the second traffic flow from the Internet, via the WAN adaptor device 2 (step S208), and performs SP processing on the initial packets of the second traffic flow (step S210). The gateway device 3 then sends the initial packets of the second traffic flow to the WAN adaptor device 2 for forwarding to the client device 5 based on the SP processing (step S212).

The gateway device 3 also creates FP processing rules for the second traffic flow, including traffic modifications resulting from the SP processing (step S214), and sends the FP processing rules for the second traffic flow to the WAN adaptor device 2 for application to subsequent packets of the second traffic flow (step S216).

The WAN adaptor device 2 receives the initial packets of the second traffic flow from the gateway device 3 (step S218), and forwards the initial packets to the client device 5 based on the SP processing (step S220).

The WAN adaptor device 2 receives FP processing rules for the second traffic flow from the gateway device 3 (step S222), and applies the FP processing rules to subsequent packets of the second traffic flow to perform traffic modifications on the subsequent packets of the second traffic flow (step S224).

As a result of the gateway device 3 creating and sending the FP processing rules for the second traffic flow, and the WAN adaptor device 2 applying the FP processing rules for the second traffic flow that are received from the gateway device 3, the WAN adaptor device 2 can perform the traffic modifications on the subsequent packets of the second traffic flow itself (using the duplicated FP processing rules), and forward the subsequent packets of the second traffic flow to the client device 5 directly (S226), without bridging the subsequent packets of the second traffic flow to the gateway device 3 for FP processing.

According to the above-described system and methods for optimizing traffic routing operations in a two-box WLAN setup, the gateway device 3 determines the packet transformations that are required to perform the Fastpath (FP) processing, and updates the WAN adaptor device 2 with the FP processing rules so that the WAN adaptor device 2 knows what data has to be changed in the subsequent packets (e.g., to filter traffic in a fraction of the time it takes to perform the hairpin operation to/from the gateway device 3). For example, assuming each hop has a delay of 2-10 ms, cutting out two of the three hops using the traffic routing optimization techniques described herein can reduce latency substantially.

The processes and software programs disclosed above constitute algorithms that can be effected by software, applications (apps, or mobile apps), computer programs, or a combination thereof (e.g. an app on a mobile device operating in conjunction with and/or in communication with a software program on the electronic apparatus (router) and/or a software program on the remote servers in the cloud). The software, applications, computer programs (and also device data and various other types of information) can be stored on a non-transitory computer-readable medium for causing a computer, such as the one or more processors, to execute the processes described herein and shown in the drawing figures.

The term non-transitory computer-readable recording medium refers to a computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Iglu-ray disc. Combinations of the above are also included within the scope of computer-readable media.

The above-described example embodiments may be implemented as any combination of an apparatus, a system, an integrated circuit, and a computer program on a non-transitory computer readable recording medium. The one more processor(s) may be implemented as an integrated circuit (IC), an application specific integrated circuit (ASIC), or large-scale integrated circuit (LSI), system LSI, super LSI, or ultra LSI components that perform a part or all of the functions described herein.

The invention claimed is:

1. A network device for optimizing traffic routing operations in a two-box wireless local area network (WLAN) setup, the network device comprising:
   a memory storing instructions; and
   a processor configured to execute the instructions to:
      establish a dedicated wireless backhaul connection between the network device and a wide area network (WAN) adaptor device;
      receive initial packets of a traffic flow from a client device associated with the WLAN, via the WAN adaptor device;
      perform slowpath (SP) processing on the initial packets of the traffic flow;
      send the initial packets of the traffic flow to the WAN adaptor device for forwarding to the Internet based on the SP processing;

create first fastpath (FP) processing rules for the traffic flow for implementation by the WAN adaptor, the first FP processing rules including modifications to packet information for performing FP processing functions of the network device on packets of the traffic flow; and send the first FP processing rules to the WAN adaptor device for application by the WAN adaptor device of the FP processing functions of the network device to subsequent packets of the traffic flow, wherein the first FP processing rules for the traffic flow that are created and sent by the network device enable the WAN adaptor device to perform the modifications on the subsequent packets of the traffic flow, and forward the subsequent packets of the traffic flow to the Internet directly, without bridging the subsequent packets of the traffic flow to the network device for FP processing.

2. The network device of claim 1, wherein the processor is further configured to execute the instructions to:

identify the modifications resulting from the SP processing on the initial packets of the traffic flow, wherein the modifications include rewriting a source Layer 2 media access control (L2 MAC) address of the packets to match a wide area network (WAN) MAC address of the network device.

3. The network device of claim 1, wherein the processor is further configured to execute the instructions to:

receive initial packets of a second traffic flow from the Internet, via the WAN adaptor device;

perform SP processing on the initial packets of the second traffic flow;

send the initial packets of the second traffic flow to the WAN adaptor device for forwarding to the client device based on the SP processing;

create second FP processing rules for the second traffic flow, the second FP processing rules including modifications to packet information based on the SP processing by network device; and send the second FP processing rules for the second traffic flow to the WAN adaptor device for application to subsequent packets of the second traffic flow.

4. The network device of claim 3, wherein the second FP processing rules for the second traffic flow that are created and sent by the network device enable the WAN adaptor device to perform the modifications on the subsequent packets of the second traffic flow, and forward the subsequent packets of the traffic flow to the Internet directly, without bridging the subsequent packets of the second traffic flow to the network device for FP processing.

5. A method for optimizing traffic routing operations in a two-box wireless local area network (WLAN) setup including a network device and a wide area network (WAN) adaptor device, the method comprising:

establishing a dedicated wireless backhaul connection between the network device and the WAN adaptor device;

receiving initial packets of a traffic flow from a client device associated with the WLAN, via the WAN adaptor device;

performing slowpath (SP) processing on the initial packets of the traffic flow;

sending the initial packets of the traffic flow to the WAN adaptor device for forwarding to the Internet based on the SP processing;

creating, by the network device, first fastpath (FP) processing rules for the traffic flow for implementation by the WAN adaptor, the first FP processing rules including modifications to packet information for performing FP processing functions of the network device on packets of the traffic flow; and sending, by the network device, the first FP processing rules to the WAN adaptor device for application by the WAN adaptor device of the FP processing functions of the network device to subsequent packets of the traffic flow, wherein the first FP processing rules for the traffic flow that are created and sent by the network device enable the WAN adaptor device to perform the modifications on the subsequent packets of the traffic flow, and forward the subsequent packets of the traffic flow to the Internet directly, without bridging the subsequent packets of the traffic flow to the network device for FP processing.

6. The method of claim 5, further comprising:

identifying the modifications resulting from the SP processing on the initial packets of the traffic flow, wherein the modifications include rewriting a source Layer 2 media access control (L2 MAC) address of the packets to match a wide area network (WAN) MAC address of the network device.

7. The method of claim 5, further comprising:

receiving initial packets of a second traffic flow from the Internet via the WAN adaptor device;

performing SP processing on the initial packets of the second traffic flow;

sending the initial packets of the second traffic flow to the WAN adaptor device for forwarding to the client device based on the SP processing;

creating, by the network device, second FP processing rules for the second traffic flow, the second FP processing rules including modifications to packet information based on the SP processing; and sending, by the network device, the second FP processing rules for the second traffic flow to the WAN adaptor device for application by the WAN adaptor device to subsequent packets of the second traffic flow.

8. The method of claim 7, wherein the second FP processing rules for the second traffic flow that are created and sent by the network device enable the WAN adaptor device to perform the modifications on the subsequent packets of the second traffic flow, and forward the subsequent packets of the traffic flow to the Internet directly, without bridging the subsequent packets of the second traffic flow to the network device for FP processing.

9. A wide area network (WAN) adaptor device for optimizing traffic routing operations in a two-box wireless local area network (WLAN) setup, the WAN adaptor device comprising:

a memory storing instructions; and a processor configured to execute the instructions to:

establish a dedicated wireless backhaul connection between the WAN adaptor device and a network device;

receive initial packets of a traffic flow from a client device associated with the WLAN;

send the initial packets of the traffic flow to the network device for slowpath (SP) processing;

receive the initial packets of the traffic flow from the network device, and forward the initial packets to the Internet based on the SP processing;

receive first fastpath (FP) processing rules for the traffic flow from the network device for implementation by the WAN adaptor, the first FP processing rules including modifications to packet information for performing FP processing functions of the network device on packets of the traffic flow; and apply the first FP processing rules related to the FP processing functions of the network device to subsequent packets of the traffic flow to perform the modifications on the subsequent packets of the traffic flow, wherein the first FP processing rules for the traffic flow that are created and sent by the network device enable the WAN adaptor device to perform the modifications on the subsequent packets of the traffic flow, and forward the subsequent packets of the traffic flow to the Internet directly, without bridging the subsequent packets of the traffic flow to the network device for FP processing.

10. The WAN adaptor device of claim 9, wherein the modifications to the subsequent packets of the traffic flow include rewriting a source Layer 2 media access control (MAC) address of the packets to match a WAN MAC address of the network device.

11. The WAN adaptor device of claim 9, wherein the processor is further configured to execute the instructions to:

receive initial packets of a second traffic flow from the Internet;

send the initial packets of the second traffic flow to the network device for SP processing;

receive the initial packets of the second traffic flow from the network device, and forward the initial packets to the client device based on the SP processing;

receive second FP processing rules for the second traffic flow from the network device, the second FP processing rules including modifications to packet information for performing FP processing by the WAN adaptor based on the SP processing by the network device; and apply the second FP processing rules to subsequent packets of the second traffic flow to perform the modifications on the subsequent packets of the second traffic flow.

12. The WAN adaptor device of claim 11, wherein, as a result of applying the second FP processing rules for the second traffic flow that are received from the network device, the WAN adaptor device forwards the subsequent packets of the second traffic flow to the client device directly, without bridging the subsequent packets of the second traffic flow to the network device for FP processing.

13. A method for optimizing traffic routing operations in a two-box wireless local area network (WLAN) setup including a wide area network (WAN) adaptor device and a network device, the method comprising:

establishing a dedicated wireless backhaul connection between the WAN adaptor device and the network device;

receiving initial packets of a traffic flow from a client device associated with the WLAN;

sending, by the WAN adaptor device, the initial packets of the traffic flow to the network device for slowpath (SP) processing;

receiving, by the WAN adaptor device, the initial packets of the traffic flow from the network device, and forwarding the initial packets to the Internet based on the SP processing;

receiving, by the WAN adaptor device, first fastpath (FP) processing rules for implementation by the WAN adaptor on the traffic flow from the network device, the first FP processing rules including modifications to packet information for performing FP processing functions of the network device on packets of the traffic flow; and applying, by the WAN adaptor device, the first FP processing rules related to the FP processing functions of the network device to subsequent packets of the traffic flow to perform the modifications on the subsequent packets of the traffic flow, wherein the first FP processing rules for the traffic flow that are created and sent by the network device enable the WAN adaptor device to perform the modifications on the subsequent packets of the traffic flow, and forward the subsequent packets of the traffic flow to the Internet directly, without bridging the subsequent packets of the traffic flow to the network device for FP processing.

14. The method of claim 13, wherein the modifications include rewriting a source Layer 2 media access control (MAC) address of the traffic flow to match a WAN MAC address of the network device.

15. The method of claim 13, further comprising:

receiving initial packets of a second traffic flow from the Internet;

sending the initial packets of the second traffic flow to the network device for SP processing;

receiving the initial packets of the second traffic flow from the network device, and forwarding the initial packets to the client device based on the SP processing;

receiving, by the WAN adaptor device, second FP processing rules for the second traffic flow from the network device, the second FP processing rules including modifications to packet information for performing FP processing; and applying, by the WAN adaptor device, the second FP processing rules to subsequent packets of the second traffic flow to perform the modifications on the subsequent packets of the second traffic flow.

16. The WAN adaptor device of claim 15, wherein, as a result of applying the second FP processing rules for the second traffic flow that are received from the network device, the WAN adaptor device forwards the subsequent packets of the second traffic flow to the client device directly, without bridging the subsequent packets of the second traffic flow to the network device for FP processing.

* * * * *